UNITED STATES PATENT OFFICE.

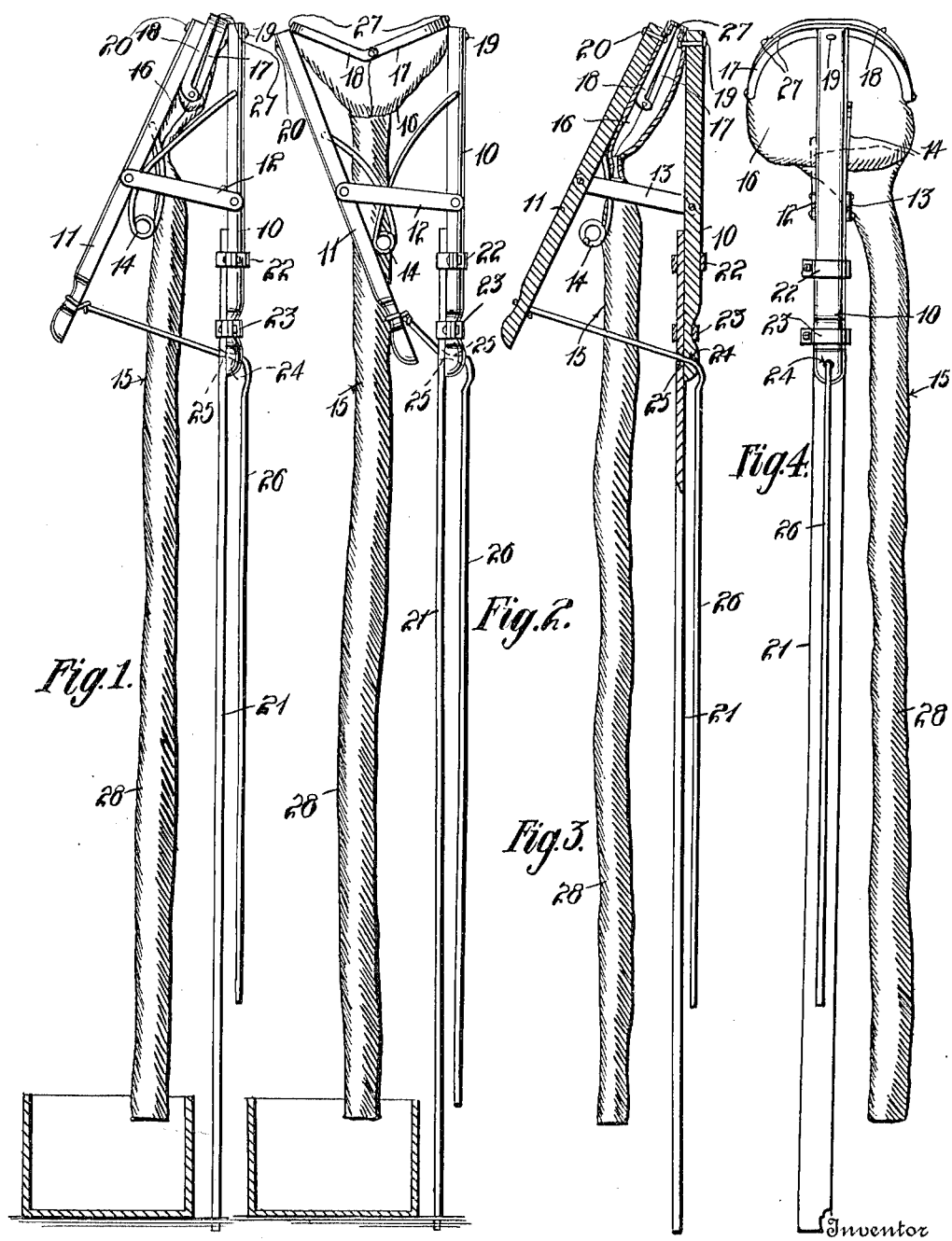

LILLIE M. RICHARDSON, OF FARMVILLE, VIRGINIA.

FRUIT-PICKER.

1,063,833.            Specification of Letters Patent.            Patented June 3, 1913.

Application filed July 2, 1912. Serial No. 707,320.

*To all whom it may concern:*

Be it known that I, LILLIE M. RICHARDSON, a citizen of the United States, residing at Farmville, in the county of Prince Edward, State of Virginia, have invented certain new and useful Improvements in Fruit-Pickers; and I do hereby declare the following to be a full, clear, and exact description of the invention, such as will enable others skilled in the art to which it appertains to make and use the same.

This invention relates to fruit pickers.

The object of the invention resides in the provision of a device of the character named which will efficiently prevent the bruising of fruit in the gathering of same, and which will be simple in construction, easy of operation and comparatively inexpensive to manufacture.

With the above and other objects in view, the invention consists in the details of construction and in the arrangement and combination of parts to be hereinafter more fully described and particularly pointed out in the appended claims.

In describing the invention in detail, reference will be had to the accompanying drawings wherein like characters of reference denote corresponding parts in the several views, and in which—

Figure 1 is a side elevation of a fruit picker constructed in accordance with the invention and with the mouth of the fruit receiving bag shown in closed position, Fig. 2, a view similar to Fig. 1 showing the position of the various parts of the device when the mouth of the fruit receiving bag has been operated to open or receiving position, Fig. 3, a longitudinal section of what is shown in Fig. 1, and Fig. 4, a front elevation of what is shown in Fig. 1.

Referring to the drawings the device is shown as comprising arms 10 and 11 which are pivotally mounted respectively between opposite ends of links 12 and 13. The outer ends of these arms 10 and 11 are normally forced toward each other by means of a spring 14 disposed between said arms and between said links. Disposed between the forward ends of the arms 10 and 11 is a fruit receiving flexible tubular member 15 provided with an outwardly disposed mouth 16. The lips of the mouth 16 are formed of pivotally connected metallic jaws 17 and 18, while the remainder of the member 15 is formed of a suitable soft flexible material which will not injure or bruise the fruit coming in contact therewith. By this construction it will be apparent that as the outer ends of the arms 10 and 11 are moved away from each other against the influence of the spring 14 the jaws 17 and 18 will be open so that a desired fruit may be received within the member 15, it being of course understood that the member 15 is suitably secured to the outer ends of the arms 10 and 11 centrally of the jaws 17 and 18 as at 19 and 20 respectively. The arm 10 is secured to a handle 21 by means of clamps 22 and 23 and said arm and handle are provided with registering openings 24 and 25 respectively. Passing through the openings 24 and 25 and having one end thereof secured to the inner end of the arm 11 is an operating cable 26 through the instrumentality of which the arms 10 and 11 may be operated to open the mouth of the member 15 when the device is elevated and disposed in operative position with respect to fruit suspended from a tree.

It will be noted that the jaws 17 and 18 are provided respectively with inwardly directed flanges 27 which may be suitably sharpened so as to constitute coöperating knives adapted to engage and sever the stem of the fruit. It will be further noted that the portion of the member 15 adjacent the jaws 17 and 18 is funnel shape while the remainder of the member is constituted of a stem 28 of a size sufficient to permit the passage of a single fruit therethrough. This stem 28 is of sufficient length to reach to the ground when the device is being utilized so that as each fruit is severed it will pass by gravity through the stem 28 and be delivered into a suitable basket or receptacle seated upon the ground.

What is claimed is:

1. A fruit picker comprising a handle, an arm connected to one end of said handle, a pair of links having corresponding ends pivotally connected to said arm on opposite sides of the latter respectively, a second arm pivotally mounted between the other end of said links, spring means constantly tending to force the ends of the arms remote from the handle toward each other, a flexible tubular member provided with a mouth disposed between said arms and having opposite sides thereof secured to the ends of the arms remote from the handle respectively whereby the movement of said ends of the arms toward and away from each other will close and open said mouth, and means for moving said ends of the arms away from each other against the influence of said spring means.

2. A fruit picker comprising a handle, an arm connected to one end of said handle, a pair of links having corresponding ends pivotally connected to said arm on opposite sides of the latter respectively, a second arm pivotally mounted between the other ends of said links, spring means constantly tending to force the ends of the arms remote from the handle toward each other, a flexible tubular member provided with a mouth disposed between said arms and having opposite sides thereof secured to the ends of the arms remote from the handle respectively whereby the movement of said ends of the arms toward and away from each other will close and open said mouth, a pair of pivoted jaws mounted in the mouth of the member and constituting the lips of said mouth, inwardly directed flanges on said jaws adapted to coöperate with each other when closed upon the stem of a fruit to sever said stem and means for moving the ends of the arms remote from the handle away from each other against the influence of said spring means.

3. A fruit picker comprising a handle, an arm connected to one end of said handle, a pair of links having corresponding ends pivotally connected to said arm on opposite sides of the latter respectively, a second arm pivotally mounted between the other ends of said links, spring means constantly tending to force the ends of the arms remote from the handle toward each other, a flexible tubular member provided with a mouth disposed between said arms and having opposite sides of its mouth secured to the ends of the arms remote from the handle respectively whereby the movement of said ends of the arms toward and away from each other will close and open said mouth, an extension on the inner end of said member having a relatively small diameter, and means for moving the ends of the arms remote from the handle away from each other against the influence of said spring means.

In testimony whereof, I affix my signature, in presence of two witnesses.

LILLIE M. RICHARDSON.

Witnesses:
W. M. DUVALL,
E. P. DAHL.

---

Copies of this patent may be obtained for five cents each, by addressing the "Commissioner of Patents, Washington, D. C."